Oct. 7, 1958   E. PIQUEREZ   2,854,815
DOUBLE WATCH CRYSTAL WITH MOISTURE
ABSORBENT AND INDICATING PACKING
Filed Sept. 2, 1955

United States Patent Office 2,854,815
Patented Oct. 7, 1958

---

2,854,815
DOUBLE WATCH CRYSTAL WITH MOISTURE ABSORBENT AND INDICATING PACKING

Ervin Piquerez, Bassecourt, Switzerland

Application September 2, 1955, Serial No. 532,217

Claims priority, application Switzerland September 24, 1954

3 Claims. (Cl. 58—90)

My invention has for its object a time-piece wherein the time indicating means are protected by two superposed glasses of different material located at a distance from each other, so as to form a gap between them, the inner glass being made of conventional glass material and the outer glass of synthetic material.

A preferred embodiment of my invention is illustrated in accompanying drawings, wherein each of the four figures is an axial partial cross-section of one of said embodiments.

Figure 1:
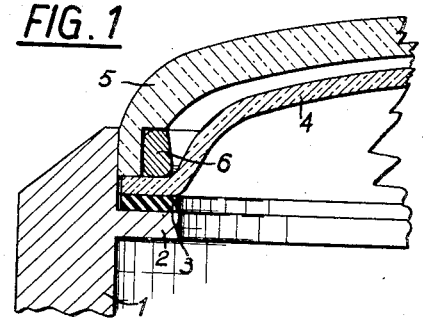

In the embodiment of Fig. 1, 1 designates the watch case rim and 2 a flange thereof. On the latter, rests with the interposition of a compressible packing 3 a glass 4 of conventional glass material. The latter is held in position by the inturned edge of the glass 5 made of synthetic material and the major part of which is located above and at a small distance from the glass 4. Said inturned edge of the upper glass 5 is driven into the rim 1 and is urged against the latter through the elastic ring 6.

It is a well known fact that conventional glass is perfectly waterproof while this is not always the case for glasses made of synthetic material. Preference is generally however given to the latter, chiefly because they are unbreakable. The arrangement illustrated shows the advantage that the glass of conventional glass material 4 is protected against shocks by the glass of synthetic material 5 so that the superposition of the two glasses prevents in practice any introduction of moisture into the case of the watch or the like time-piece through said glasses.

Figure 2:
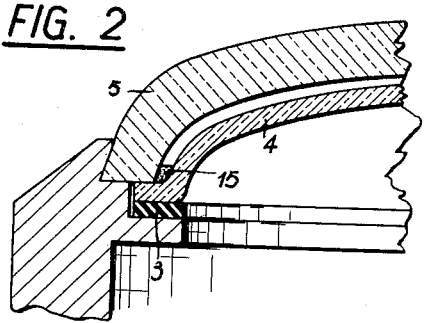

In the embodiment illustrated in Fig. 2, the glass of synthetic material 5, the edge of which is frusto-conical, is fitted in a similarly shaped recess formed inside the rim. It holds, as precedingly, the glass 4 of conventional glass material in contacting relationship with the packing 3. 15 designates a ring of some material adapted to absorb moisture such as a dry silica gel ($SiO_2$), said ring being housed inside the gap separating the two glasses 4 and 5. This prevents the formation of vapors on the inner surface of the outer glass 5. It is also possible to insert inside said gap a material which changes color when subjected to the action of moisture, for instance a salt of cobalt and more particularly cobalt chloride ($CoCl_2$) which under the action of moisture changes from blue to pink; thus the wearer is warned that his watch is no longer fluidtight.

Figure 3:
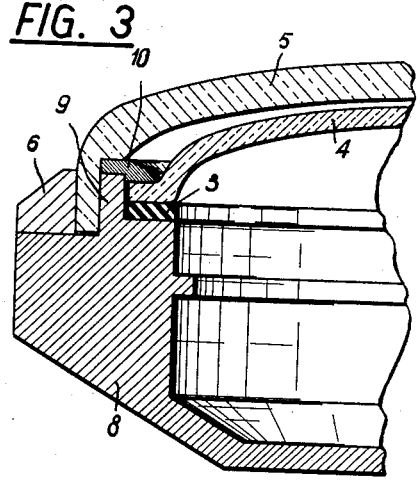

In the embodiment illustrated in Fig. 3, the case includes a bottom 8 rigid with the peripheral wall of the case and provided with an upstanding rim against the outer surface of which the glass of synthetic material 5 is clamped by the ring 6. The glass 4 of conventional glass material is held fast against its packing 3, through the agency of a ring 10 which is clamped in its turn between the upper edge of the above mentioned upstanding rim 9 and the shoulder on the glass of synthetic material 5. Said ring 10 may carry a flat succession of time indications in hollow or in relief, formed within the actual material of the ring or inserted therein. Thus, it is possible to free the path followed by the hands which may thus match the shape of the dial, whether flat or incurved, with a strict minimum safety clearance between the outer hand and the glass 4.

Figure 4:
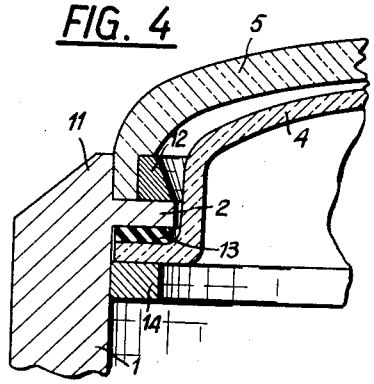

In the embodiment illustrated in Fig. 4, there is also provided as precedingly an ordinary rim the flange 2 of which carries the glass of synthetic material 5 which is clamped against an upstanding shoulder 11 of the peripheral wall of the case through the thrust exerted by the ring 12 on the inside of the inturned edge of the glass 5.

The glass of conventional glass material 4 is fitted inside the watch case through an upward movement and it is clamped with the interposition of the packing 13 against the flange 2 through the agency of a ring 14 driven also inside the case through an upward movement.

Instead of a plastic packing 3 or 13, it is possible to resort to a waterproof cement which welds the edge of the case to at least the inner glass.

What I claim is:

1. In a time-piece, the combination of a case including a rim, a glass of conventional glass material fitted inside said rim, an outer glass of synthetic material fitted over the first glass on said rim with a gap between at least the major portions of the areas of the surfaces of the glasses facing each other, and an annular packing of moisture absorbing material inside the gap between the two glasses.

2. In a time-piece, the combination of a case including a rim, a glass of conventional glass material fitted inside said rim, an outer glass of synthetic material fitted over the first glass on said rim with a gap between at least the major portions of the areas of the surfaces of the glasses facing each other, and an annular packing incorporating a substance adapted to change color under the action of moisture inside the gap between the two glasses.

3. In a time-piece, the combination of a case including a rim, a glass fitted inside said rim, an outer glass of synthetic material fitted over the first glass on said rim with a broad gap between at least the major portions of the areas of the surfaces of the glasses facing each other, and an annular packing of moisture absorbing material inside the gap between the two glasses.

References Cited in the file of this patent

UNITED STATES PATENTS

| | | |
|---|---|---|
| 1,909,739 | Zubaty | May 16, 1933 |
| 1,925,999 | De Giers | Sept. 5, 1933 |

FOREIGN PATENTS

| | | |
|---|---|---|
| 137,472 | Great Britain | Jan. 15, 1920 |
| 215,706 | Switzerland | Oct. 16, 1941 |
| 1,074,203 | France | Mar. 31, 1954 |